(12) United States Patent
El Hallak et al.

(10) Patent No.: US 12,451,666 B2
(45) Date of Patent: Oct. 21, 2025

(54) LASER HEAT SINKING FOR INTEGRATING LASER DIODE INTO RECORDING HEADS AT WAFER LEVEL

(71) Applicant: Seagate Technology LLC, Fremont, CA (US)

(72) Inventors: Fadi El Hallak, Londonderry (GB); Bryn John Howells, Londonderry (GB); Michael Gerald Boyle, Derry (IE); Frank Anthony McGinnity, Derry (IE); Martin Liam McGarry, Ballymena (IE)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 815 days.

(21) Appl. No.: 17/657,164

(22) Filed: Mar. 30, 2022

(65) Prior Publication Data

US 2023/0318257 A1 Oct. 5, 2023

(51) Int. Cl.
*H01S 5/024* (2006.01)
*G11B 5/127* (2006.01)
*G11B 5/40* (2006.01)
*H01S 5/026* (2006.01)
*G11B 5/00* (2006.01)

(52) U.S. Cl.
CPC .......... *H01S 5/02476* (2013.01); *H01S 5/026* (2013.01); *G11B 2005/0021* (2013.01); *G11B 5/127* (2013.01); *G11B 5/40* (2013.01)

(58) Field of Classification Search
CPC ...... H01S 5/024–02492; H01S 5/0235–02385; G11B 5/40; G11B 2005/0021; G11B 5/127; G11B 5/4866; G11B 33/1406
See application file for complete search history.

(56) References Cited

U.S. PATENT DOCUMENTS

| | | | |
|---|---|---|---|
| 6,404,706 B1 | 6/2002 | Stovall et al. | |
| 6,728,082 B2 * | 4/2004 | Tabat | G11B 5/40 360/323 |
| 8,526,275 B1 | 9/2013 | Yuan et al. | |
| 8,532,156 B2 * | 9/2013 | Olson | G02B 6/4274 438/18 |
| 8,873,348 B2 | 10/2014 | Hipwell et al. | |

(Continued)

FOREIGN PATENT DOCUMENTS

EP 1267459 A1 12/2002

OTHER PUBLICATIONS

Akira Yamaguchi, Relationship between Reverse-Biased Electrostatic-Discharge Tolerance and Aging of GaInAsP InP Buried-Heterostructure Laser Diodes, Japanese Journal of Applied Physics, ResearchGate, https://www.researchgate.net/publication/270638305, Apr. 2009, pp. 1-6.

*Primary Examiner* — Joshua King

(57) ABSTRACT

A method comprising the steps of forming a recording head comprising a waveguide, a heat sink and a bleed resistor on a first substrate, is described. The bleed resistor is coupled to the heat sink and the substrate. The top surface of the heat sink is planarized to form a planarized heat sink. A laser diode formed on a second substrate is transfer printed onto the planarized heat sink to form an integrated laser diode.

11 Claims, 7 Drawing Sheets

(56) References Cited

U.S. PATENT DOCUMENTS

| | | | | |
|---|---|---|---|---|
| 8,923,357 | B2* | 12/2014 | Olson | H01S 5/20 |
| | | | | 372/87 |
| 9,431,036 | B2 | 8/2016 | Vavra et al. | |
| 9,576,595 | B1* | 2/2017 | Hipwell, Jr. | H01S 5/02326 |
| 9,824,705 | B1* | 11/2017 | Macken | G11B 5/455 |
| 9,966,093 | B1* | 5/2018 | Naniwa | G11B 5/4833 |
| 10,861,489 | B1* | 12/2020 | Habibi | H01S 5/0225 |
| 11,069,376 | B1* | 7/2021 | McGurk | G11B 5/6088 |
| 11,114,120 | B2 | 9/2021 | Habibi et al. | |
| 2004/0151505 | A1* | 8/2004 | Aronson | H01S 5/02212 |
| | | | | 257/E23.19 |
| 2005/0174687 | A1* | 8/2005 | Edelman | G11B 5/127 |
| 2006/0198057 | A1* | 9/2006 | Leung | B82Y 25/00 |
| | | | | 360/323 |
| 2016/0163343 | A1* | 6/2016 | Olson | G11B 33/1433 |
| | | | | 360/234.5 |
| 2021/0157515 | A1 | 5/2021 | Mendonsa et al. | |

* cited by examiner

LASER HEAT SINKING FOR INTEGRATING LASER DIODE INTO RECORDING HEADS AT WAFER LEVEL

BACKGROUND

Some hard disk drives (HDDs) use heat assisted magnetic recording (HAMR) technology to store information. HDDs using HAMR technology typically utilize a laser diode to heat a small spot on a magnetic media. Heating the magnetic media reduces the coercivity of the magnetic media, which enables a HAMR recording head to change the magnetization direction of a bit and thus store information to the magnetic media. A HAMR recording head also includes a waveguide that guides a laser beam from the laser diode to a near-field transducer that shapes and directs the energy from the laser diode to the magnetic media.

In some cases, the HAMR recording head and laser diode are formed using separate processes, such that alignment of the laser diode to the waveguide during assembly can be challenging. The HAMR recording head and laser diode may be integrated through a transfer printing process to form a HAMR device. Though the electrical components of a HAMR device may still operate if misaligned, misalignment between the laser diode and the waveguide can result in a loss of optical efficiency. In addition, in some cases, electrostatic discharge (ESD) events may occur during assembly. ESD events may result in catastrophic optical damage to the laser diode.

SUMMARY

The present disclosure relates to techniques for preventing or reducing ESD events during and after integration of a laser diode with a HAMR recording head. In one example, a laser diode is transfer printed to a planarized heat sink of a HAMR recording head. The planarized heat sink is connected with one or more ESD devices, such as a bleed resistor. The bleed resistor has a relatively large electrical resistance and provides a path to discharge electrostatic build up, particularly at the moment in which the laser diode makes contact with the heat sink. Additionally, post-transfer printing, the bleed resistor continues to provide ESD protection for the integrated laser diode. In addition, the manufacture and planarization of the heat sink enables more precise alignment of the laser diode to the waveguide. The planarization process provides a relatively smooth surface, which also may help to improve the yield of the transfer print process In one example, a method comprising the steps of forming a recording head including a waveguide, a heat sink and a bleed resistor on a first substrate, is described. The bleed resistor is coupled to the heat sink and the substrate. The top surface of the heat sink is planarized to form a planarized heat sink. A laser diode formed on a second substrate is transfer printed onto the planarized heat sink to form an integrated laser diode.

In another example, an apparatus comprising a recording head including a waveguide, a heat sink and a bleed resistor disposed a first substrate, is described. The bleed resistor is coupled to the heat sink and the substrate. The top surface of the heat sink is planarized to form a planarized heat sink. A laser diode is disposed on a second substrate and is transfer printed onto the planarized heat sink to form an integrated laser diode.

These and other features and aspects of various examples may be understood in view of the following detailed discussion and accompanying drawings.

DETAILED DESCRIPTION

Figure 1A:
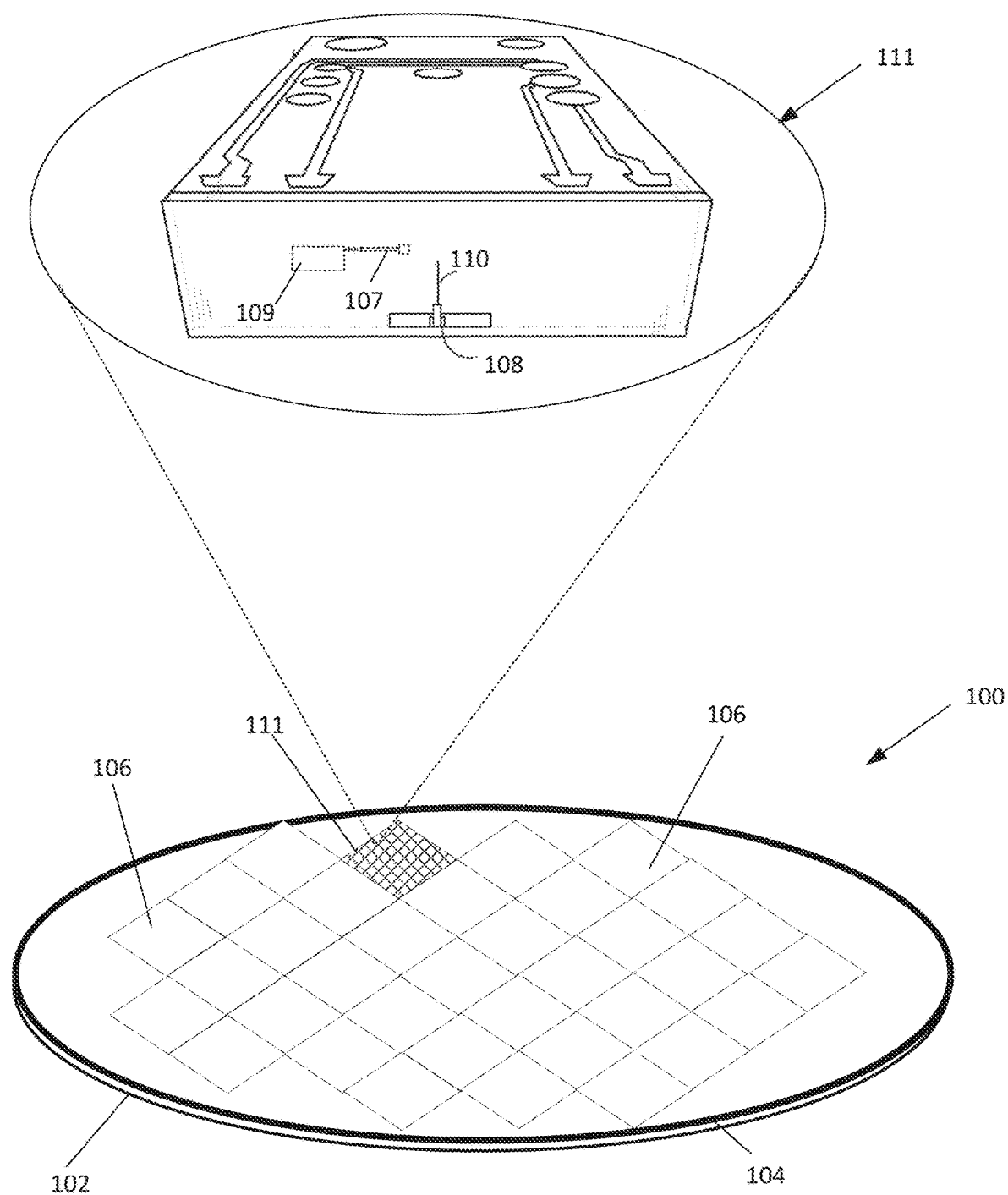
FIG. 1A is a perspective schematic view of an example HAMR recording head wafer which includes one or more HAMR recording heads.

FIG. 1A is a perspective schematic view of an example HAMR recording head wafer which includes one or more recording heads. In FIG. 1A, a HAMR recording head wafer 100 includes substrate 102 on which a plurality of thin layers 104 have been formed and patterned in a rectangular array of wafer die 106, using a sequence of known fabrication steps.

Substrate 102 is a self-supporting substrate, meaning that it has mechanical integrity sufficient to permit handling of the substrate without undue breakage or other damage. Substrate 102 may be a composite material such as AlTiC that includes aluminum oxide and titanium carbide. Thin layers 104 may include multiple layers which have been patterned and otherwise processed to provide a magnetic device. Thin layers 104 may include magnetic materials (e.g., materials including Co, Fe, Ni) or other metallic or non-metallic materials. Wafer die 106 of the HAMR recording head wafer 100 may be arranged in a rectangular array or other type of arrangement when viewing the wafer from above or in plan view. Wafer die 106 include a plurality of sliders 111. In the example of FIG. 1A, slider 111 includes bleed resistor 107, recording head 108, heat sink 109 and waveguide 110.

Figure 1B:
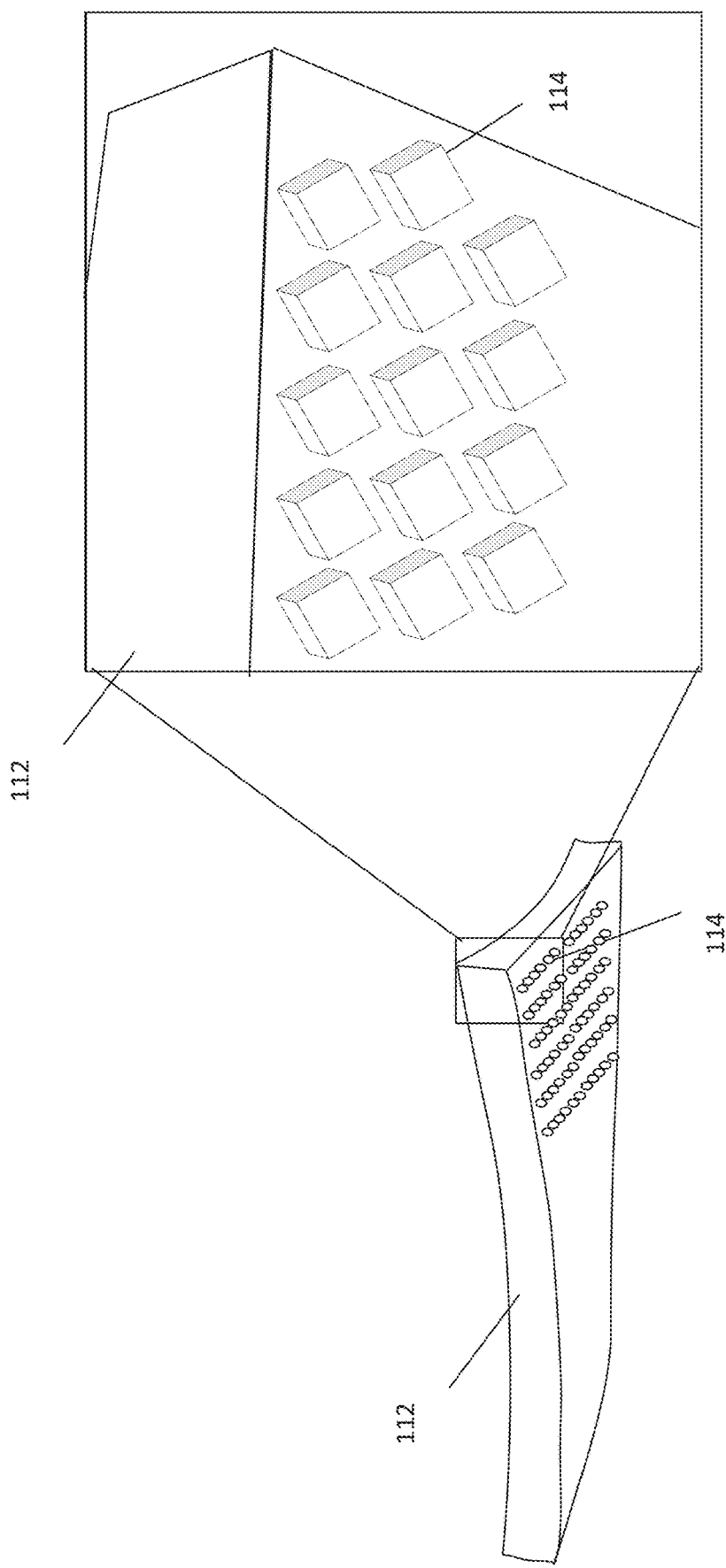
FIG. 1B is a schematic view of an example substrate which includes one or more laser diodes.

FIG. 1B is a schematic view of an example substrate which includes one or more laser diodes. In FIG. 1B, a substrate 112 includes a plurality of laser diodes 114. Substrate 112 may include multiple epitaxially grown layers of semiconductor material such as GaAs, AlGaAs or combinations thereof. Laser diodes 114 may be formed on substrate 112 via photolithography and/or other processing steps to attain a final shape and position on substrate 112. Laser diodes 114 can include a stack of epitaxial layers formed on substrate 112. A sacrificial layer may also be included between laser diodes 114 and substrate 112 to allow separation of the laser diodes 114 from substrate 112. In some examples, laser diodes 114 may be fully operational laser diodes. In other examples, laser diodes 114 may be partially manufactured laser diodes. Partially manufactured laser diodes may undergo subsequent processing steps after a transfer printing process (e.g., transfer printing process illustrated in FIGS. 2A-2E) to become fully operational.

In some cases, parts of laser diode 114, are incompatible with epitaxial growth on substrate 102. As such, laser diode 114 cannot be formed using the same layer deposition processes used to form bleed resistor 107, recording head 108, heat sink 109 and waveguide 110. In the examples described below, laser diode 114 may be formed first on substrate 112 and transferred to substrate 102 by a transfer-printing process.

Figure 2A:
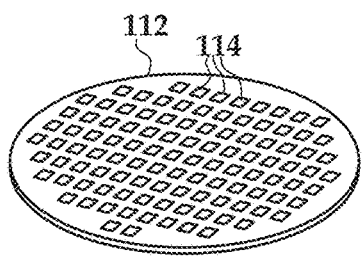
FIGS. 2A-2E show an example transfer printing process, according to various aspects of the present disclosure.
Figure 2B:
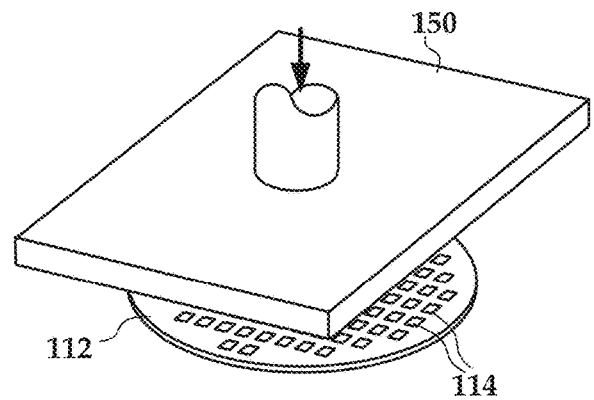
Figure 2C:
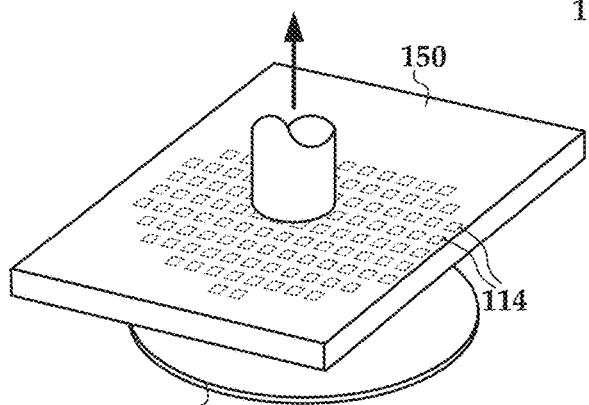
Figure 2D:
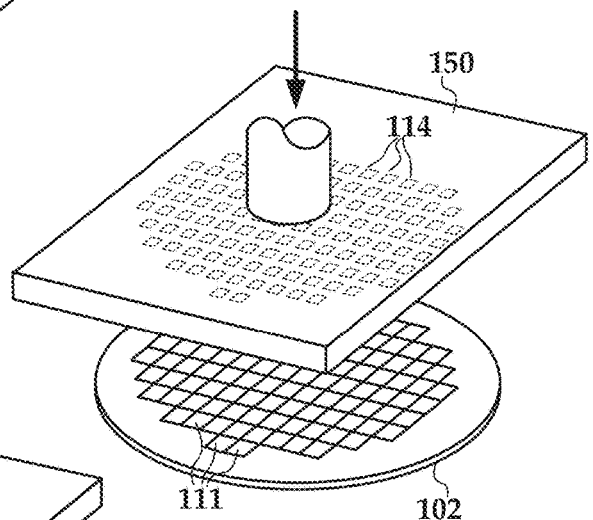
Figure 2E:
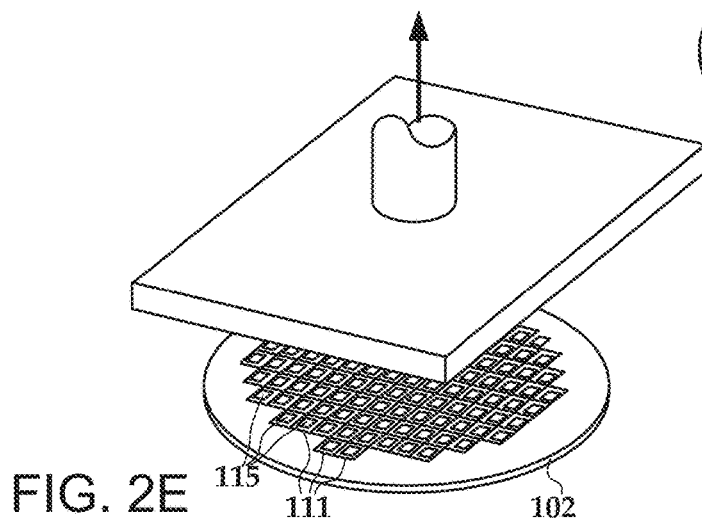

FIGS. 2A-2E show an example transfer printing process, according to various aspects of the present disclosure. FIG. 2A illustrates substrate 112 which includes a plurality of laser diodes 114. FIG. 2B illustrates transfer print head 150, substrate 112 and laser diodes 114. In the example of FIG. 2B, transfer print head 150 is lowered towards substrate 112. Transfer print head 150 is then lifted, as shown in FIG. 2C, taking laser diodes 114 with it. In this way, a plurality of laser diodes 114 can be transferred to substrate 102, as illustrated in FIGS. 2D-2E.

In the example of FIG. 2D, transfer print head 150 is lowered over substrate 102 that includes sliders 111. The surface of substrate 102 is prepared to receive laser diodes 114. In some examples, the surface of substrate 102 may include a material suitable for surface bonding and/or have preferred electrical, thermal, or thermochemical characteristics. In other examples, the surface of substrate 102 may include a planarized heat sink (e.g. heat sink 109). Transfer print head 150 presses the laser diodes 114 on to substrate 102 and is then pulled away as seen in FIG. 2E. This attaches laser diodes 114 to sliders 111 to form integrated laser diodes 115.

One challenge in forming an integrated laser diode is sensitivity of the laser diode to damage or failure from electrostatic discharge (ESD) during and/or after the transfer print process. ESD can arise in several different ways, most commonly as a result of triboelectric charging or induction. This discharge can occur either as one object is brought next to one of the charged objects or as one object is separated from the other. In the example of forming an integrated laser diode, an ESD event may lead to catastrophic optical damage (COD) of the laser diode.

Figure 3A:
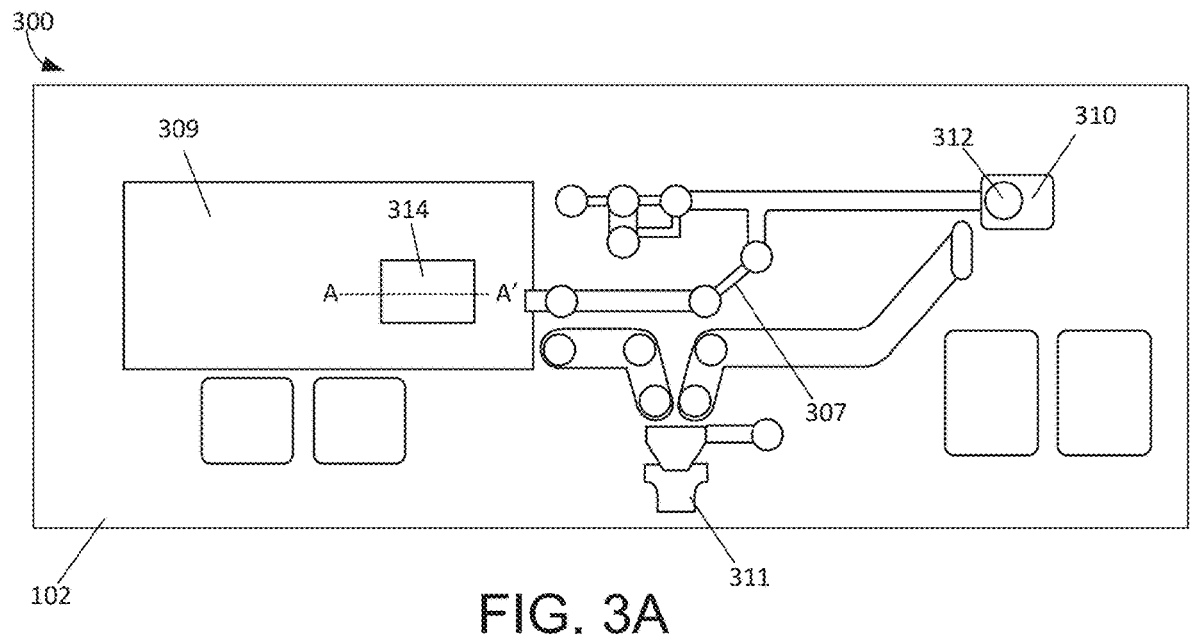
FIG. 3A is a top-down view of a slider, according to various aspects of the present disclosure.
Figure 3B:
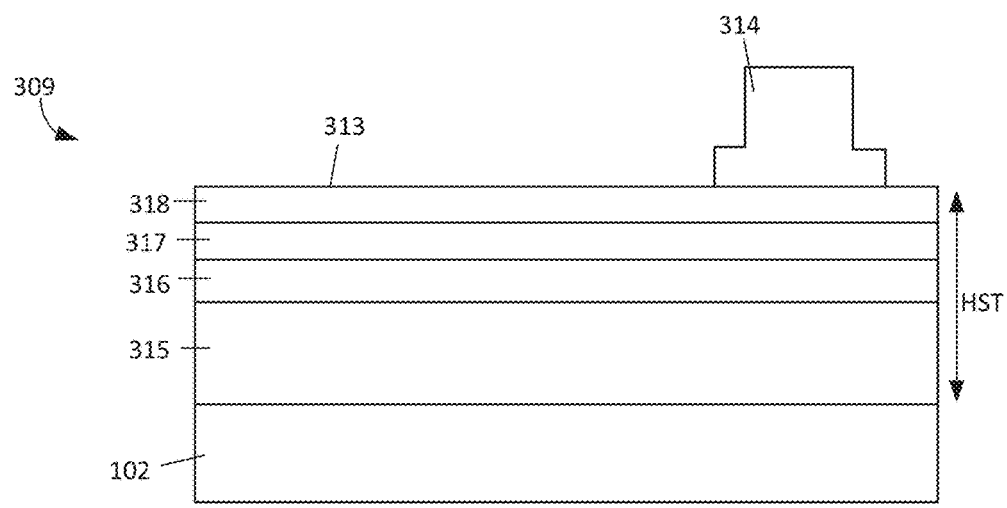
FIG. 3B is a cross-sectional view of a portion of a heat sink according to various aspects of the present disclosure.

FIG. 3A is a top-down view of a slider, according to various aspects of the present disclosure. FIG. 3B is a cross-sectional view of a heat sink, according to various aspects of the present disclosure. In the example of FIG. 3A, slider 300 (an example of slider 111 of FIG. 1) includes substrate 102, heat sink 309, laser diode 314, recording head 311, bleed resistor 307, ground pad 310 and ground via 312. In the example of FIG. 3A, bleed resistor 307 is formed on top of substrate 102. Heat sink 309 is electrically connected to ground pad 310 through bleed resistor 307. Ground pad 310 is electrically connected to substrate 102 by way of ground via 312. Bleed resistor 307 electrically connects heat sink 309 and substrate 102 across the basecoat of substrate 102. In other words, bleed resistor 307 is electrically coupled to heat sink 309 and substrate 102. In the example of FIG. 3A, bleed resistor 307 seeks to limit ESD and damage to laser diode 314 via dissipation of electrostatic charges on laser diode 314. A resistance of bleed resistor 307 is selected to provide a path so that electrostatic charges on laser diode 314 are dissipated through bleed resistor 307 to substrate 102. In the example of FIG. 3A, bleed resistor 307 is configured to prevent ESD damage to the laser diode both during and after the transfer printing process (e.g., transfer printing process illustrated in FIGS. 2A-2E).

Bleed resistor 307 may be manufactured using any appropriate semiconductor processing technique. Example semiconductor processing techniques include photoresist processes, deposition processes (e.g., vacuum deposition, sputtering, atomic layer deposition), etch processes (e.g., reactive ion etch), and mill processes (e.g., ion mill process). In some examples, bleed resistor 307 can be fabricated from a TaN film. Other bleed resistor materials include, for example, permalloy or other metals with appropriate resistance values. In the example of FIG. 3A, bleed resistor 307 may be a thin film resistor, having a resistance on the order of 5-10 kilo-ohms (k$\Omega$). The resistance value of bleed resistor 307 can be varied depending on TaN film thickness and composition. For a given TaN composition, the film thickness can be used as an independent parameter for controlling the film resistance. An example thickness range for bleed resistor 307 is from about 40 nm to about 150 nm.

FIG. 3B is a cross-sectional view of heat sink 309 taken through line A-A' of FIG. 3A. Heat sink 309 is an example of heat sink 109 of FIG. 1. Heat sink 309 includes substrate 102, laser diode 314, and one or more heat sink layers. In some examples, heat sink 309 may provide heat sinking and/or bonding for various transfer printed structures in the recording head, e.g., transfer printed laser diodes 314. In the example of FIG. 3B, heat sink 309 can be configured to cause heat to flow away from laser diode 314. In the example of FIG. 39, heat sink 309 is deposited on substrate 102. Heat sink 309 includes top surface 313 and is defined by a thickness HST.

In some examples, heat sink 309 may include multiple layers (e.g., layers 315, 316, 317, and 318). In other examples heat sink 309 may include a single layer. In the example of FIG. 3B, heat sink 309 is a multilayer heat sink and includes a plurality of layers 315, 316, 317, and 318. The materials, widths, thicknesses and/or other properties of heat sink layers 315, 316, 317, and 318 may be chosen to reduce corrosion, increase performance, and/or provide good contact between laser diode 314 and substrate 302. Properties of heat sink layers 315, 316, 317, and 318 may be chosen to match a coefficient of thermal expansion and/or other property of laser diode 314 to facilitate bonding of laser diode 314 to heat sink 309. Examples of heat sink layer materials include Cu, AN, Au, NiFe, NiCr, $Al_2O_3$ and CuW or combinations thereof.

One challenge in forming an integrated laser diode is the precise alignment needed between the laser diode and the waveguide of a recording head. Though electrical components can operate if misaligned, misalignment between a laser diode and a recording head can result in loss of optical efficiency. Loss of optical efficiency may render the integrated laser diode unusable. In some examples, the surface of a heat sink may be planarized (e.g., via a chemical mechanical polish process) in such a way as to improve alignment of the laser diode to the waveguide of the recording head. An additional benefit of planarization of the heat sink surface is an improvement in the yield of laser diode transfer in the transfer print process. In some examples, the transfer print yield can be increased from about 75% to about 90% or more, as surface roughness on top surface 313 of heat sink 309 is decreased.

In the example of FIG. 3B, heat sink 309 may be exposed to a planarization process to form a planarized heat sink. During the planarization process, material is removed from top surface 313 of heat sink 309. The amount of material removed is dependent upon the planarization process used. The planarization process can be optimized to control thickness HST of the planarized heat sink. The planarization process can be any suitable planarization process known in the art, such as a mechanical polish, chemical mechanical polish (CMP) or an electrochemical mechanical polish (EMP) process. Controlling thickness HST of heat sink 309 can determine alignment of the laser diode (e.g., laser diode 314 of FIG. 3B) to waveguide (e.g., waveguide 110 of FIG. 1A). Following the planarization process, thickness HST of heat sink 309 is reduced from a range of about 8500 nm to about 9000 nm to a range of about 8000 nm to about 9000 nm.

The planarization process may also result in a decreased surface roughness and surface flatness of heat sink 309. Achieving low surface roughness and/or low surface flatness of heat sink 309 may improve adhesion of the laser diode 314 to heat sink 309 during the transfer printing process (e.g., transfer printing process illustrated in FIG. 2A-2E) thus improving transfer print yield. Low surface roughness and/or low surface flatness on top surface 313 of heat sink 309 can be achieved by optimization of planarization parameters including slurry flow rate, downforce and rotation speeds. Planarizing heat sink 309 results in a surface roughness of the planarized heat sink of less than about 0.5 nm root mean squared.

Figure 4:
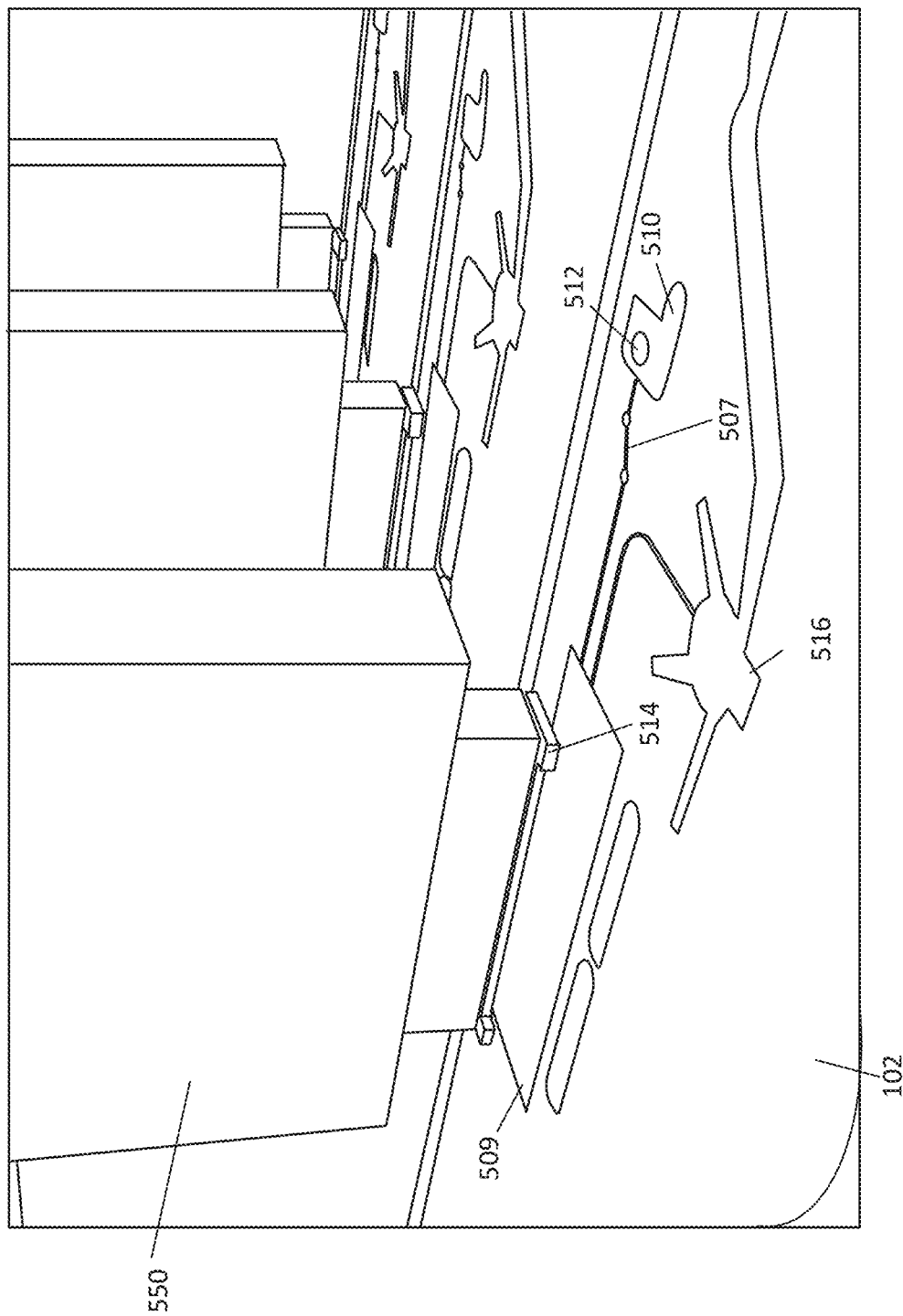
FIG. 4 is an example transfer printing process with ESD protection, according to various aspects of the present disclosure.
Figure 5:
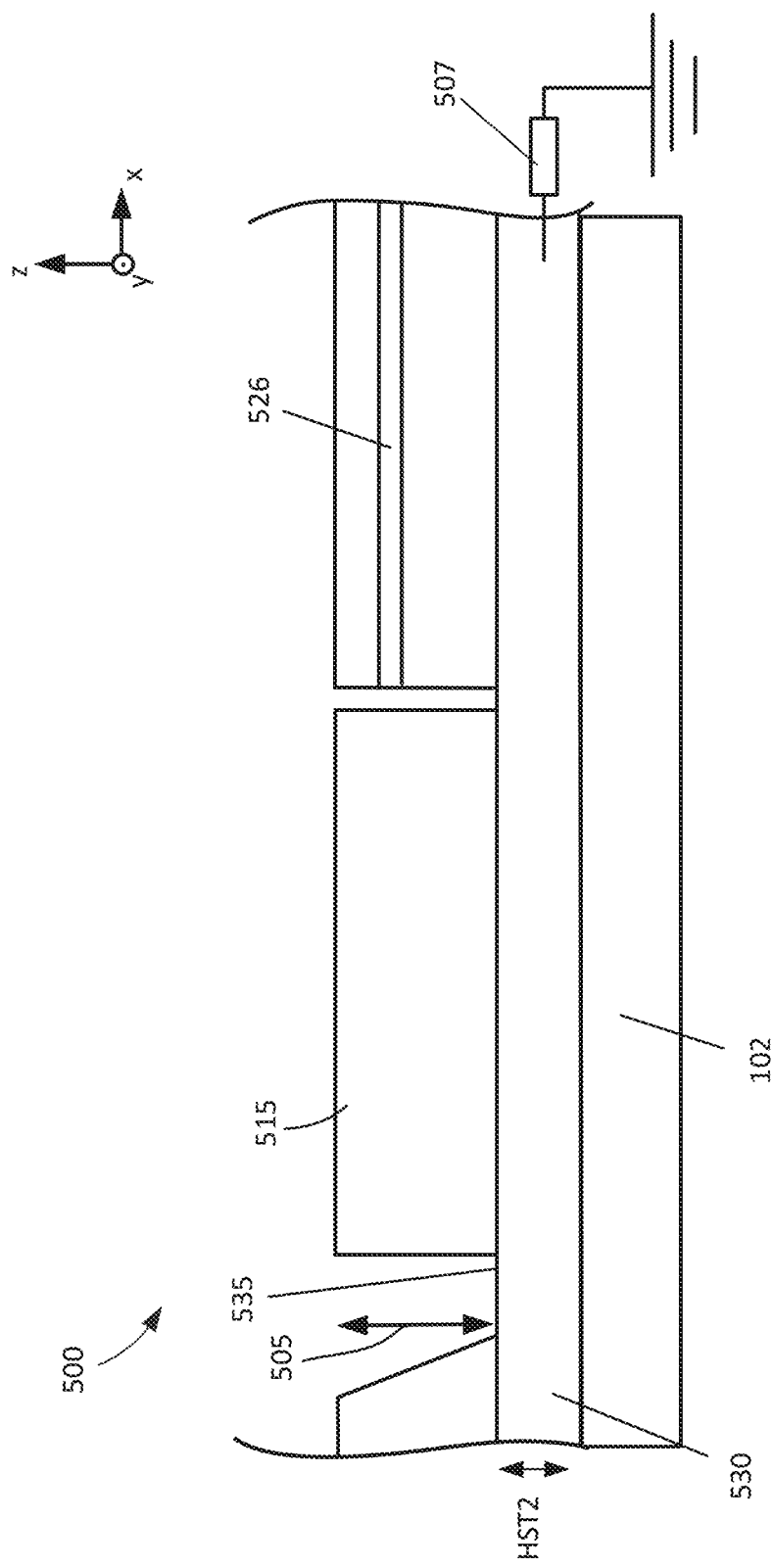
FIG. 5 is a cross-sectional view of an integrated laser diode, according to various aspects of the present disclosure.

FIG. 4 is an example of a transfer printing process with ESD protection, according to various aspects of the present disclosure. FIG. 4 illustrates substrate 102, recording head 516, laser diode 514 (an example of laser diode 114 of FIG. 1B), transfer print head 550, ground pad 510, ground via 512, heat sink 509 and bleed resistor 507. In the example of FIG. 4, transfer print head 550 (an example of transfer print head 150 of FIG. 2D) is lowered over substrate 102 until laser diode 514 makes contact with heat sink 509. Bleed resistor 507 is electrically coupled to heat sink 509 and substrate 102 via ground pad 510 and ground via 512. If any static charge is present on heat sink 509 and on laser diode 514, this static charge may be dissipated at the moment heat sink 509 makes contact with laser diode 514. Such an ESD event could lead to catastrophic optical damage of laser diode 514. Bleed resistor 507 is configured to provide a path so that electrostatic charges on laser diode 514 are dissipated through bleed resistor 507 to substrate 102 thus reducing or eliminating the likelihood of an ESD event. In the example of FIG. 4, bleed resistor 507 is configured to prevent ESD damage to laser diode 514 both during and after the transfer printing process FIG. 5 is a cross-sectional view of a slider, in accordance with various aspects of the present disclosure. Slider 500 is an example of slider 300 of FIG. 3A. In the example of FIG. 5, slider 500 includes integrated laser diode 515, substrate 102, planarized heat sink 530, top surface 535 of planarized heat sink 530, bleed resistor 507 and waveguide 526. Arrow 505 represents relative vertical alignment (i.e., in the z-direction) between integrated laser diode 515 and waveguide 526. The thickness of planarized heat sink 530 is represented by thickness HST2.

The relative vertical alignment 504 between integrated laser diode 515 and waveguide 526 can be controlled by thickness HST2 of planarized heat sink 530. Thickness HST2 can be determined by planarization parameters such as planarization time, slurry flow rate, downforce and rotation speeds. A decrease in thickness HST2 would move top surface 535 of planarized heat sink 530 in the negative z-direction thus lowering relative position of integrated laser diode 515 to waveguide 526. An increase in thickness HST2 would move top surface 535 of planarized heat sink 530 in the positive z-direction, thus moving the relative position of integrated laser diode 515 to waveguide 526 in the positive z-direction. In examples where the planarization process is optimized to align integrated laser diode 515 with waveguide 526, alignment is within about 50 nm to about 150 nm in the z-direction.

Figure 6:
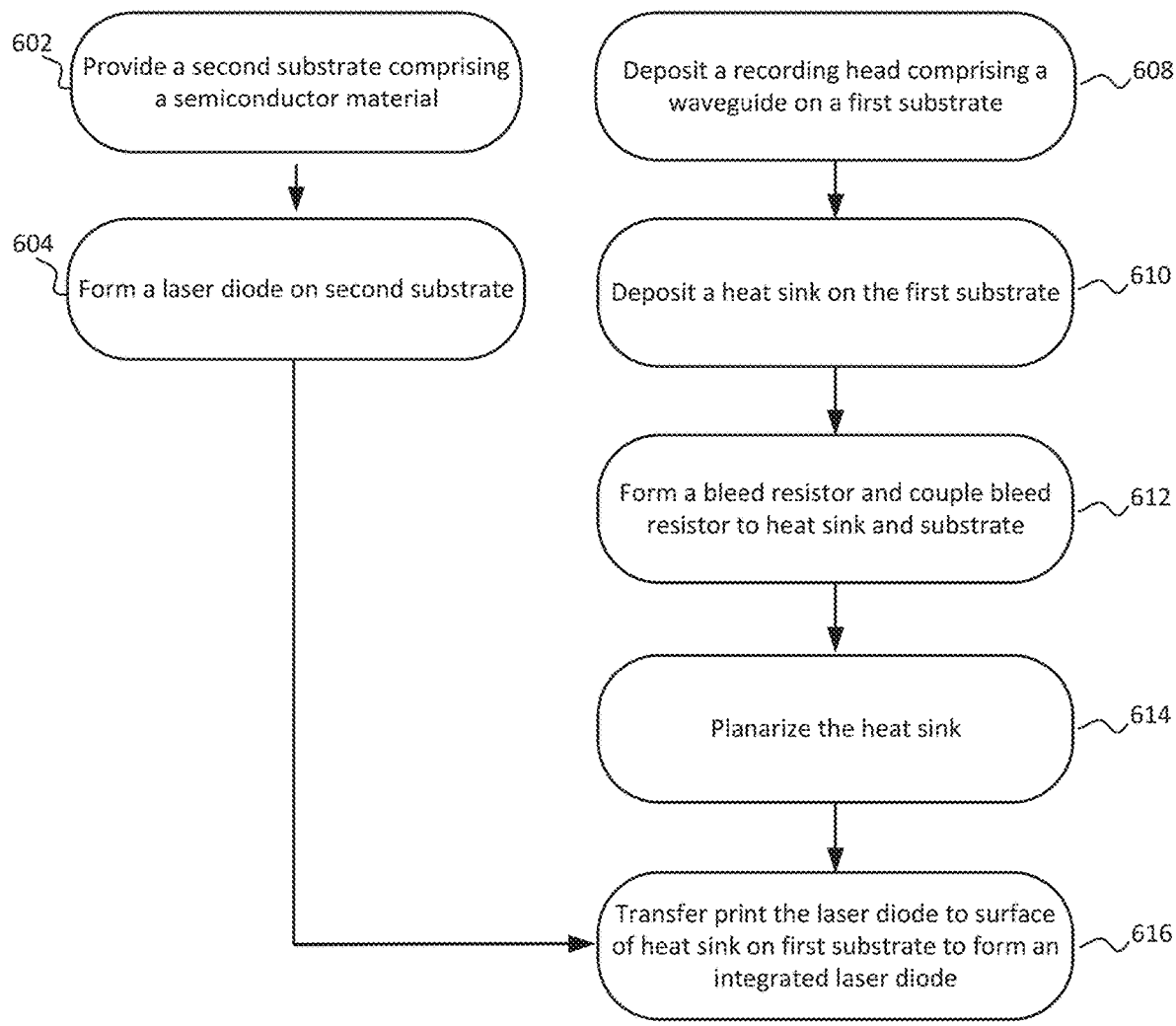
FIG. 6 is a flow diagram illustrating an example method of forming an integrated laser diode with a heat sink and ESD protection, according to various aspects of the present disclosure.

FIG. 6 is a flow diagram illustrating an example method of forming an integrated laser with a heat sink, according to various aspects of the present disclosure. The flow chart in FIG. 6 is described in reference to FIGS. 1-5. Substrate 112, including a semiconductor material, is provided (602). The semiconductor material is processed to form a laser diode 114 on substrate 112 (604). Laser diode 114 may comprise epitaxially grown layers of GaAs and AlGaAs or combinations thereof. Laser diode 114 may be formed on substrate 112 via photolithography and/or other processing steps to attain a final shape and position on substrate 112.

A recording head 108 comprising a waveguide 110 is formed on substrate 102 (608). Substrate 102 is a self-supporting substrate, meaning that it has mechanical integrity sufficient to permit handling of the substrate without undue breakage or other damage. Substrate 102 may be a composite material such as AlTiC that includes aluminum oxide and titanium carbide.

A heat sink 309 is deposited on substrate 102 (610). Heat sink 309 may include one or more heat sink layers. Bleed resistor 307 is formed on substrate 102 and is coupled to heat sink 309 and substrate 102. Bleed resistor 307 may be manufactured using any appropriate semiconductor processing technique. In some examples, bleed resistor can be fabricated from a TaN film. Bleed resistor 307 may be a thin film resistor, having a resistance on the order of 5-10 kilo-ohms (kΩ).

Heat sink 309 is planarized using a planarization process (614). For example, heat sink 309 may be planarized using a mechanical polish, chemical mechanical polish (CMP) or electrochemical mechanical polish (EMP). Laser diode 114 is transfer printed to heat sink 309 to form integrated laser diode 515 (616). During and/or after the transfer printing step, bleed resistor 307 is configured to prevent ESD damage to laser diode 314.

Various examples have been presented for the purpose of illustration and description. These and other examples are within the scope of the following claims.

What is claimed is:

1. A method comprising the steps of:
   forming a recording head comprising a waveguide on a first substrate;
   forming a heat sink on the first substrate;
   forming a bleed resistor on the first substrate, wherein the bleed resistor is coupled to the heat sink and the substrate;
   planarizing a top surface of the heat sink to form a planarized heat sink; and
   transfer printing a laser diode formed on a second substrate onto the planarized heat sink to form an integrated laser diode.

2. The method of claim 1, wherein planarizing the top surface of the heat sink includes planarizing the heat sink such that the integrated laser diode is aligned with the waveguide.

3. The method of claim 2, wherein aligning the integrated laser diode to the waveguide includes aligning the laser diode within about 50 nm to about 150 nm in a z-direction.

4. The method of claim 1, wherein planarizing the heat sink results in a surface roughness of the planarized heat sink of less than about 0.5 nm root mean squared.

5. The method of claim 1, wherein planarizing the top surface of the heat sink comprises at least one of mechanically polishing, chemically polishing or chemically mechanically polishing the top surface of the heat sink.

6. The method of claim 1, further comprising configuring the bleed resistor to prevent ESD damage to the laser diode during transfer printing.

7. The method of claim 1, further comprising configuring the bleed resistor to prevent ESD damage to the laser diode after transfer printing.

8. The method of claim 1, wherein a resistance of the bleed resistor is between about 5 and about 10 kilo-Ohms.

9. The method of claim 1, wherein depositing the heat sink comprises depositing a multilayer structure.

10. The method of claim 1, wherein the heat sink comprises Cu, AlN, Au, NiFe, NiCr, $Al_2O_3$, CuW or combinations thereof.

11. The method of claim 1, further comprising electrically grounding the first substrate.

\* \* \* \* \*